United States Patent

Stookey et al.

[15] 3,702,039
[45] Nov. 7, 1972

[54] PRODUCTION OF USABLE PRODUCTS FROM WASTE MATERIAL

[72] Inventors: Kenneth W. Stookey, Markle, Ind.; Anil K. Chatterjee, Tonawanda, N.Y.

[73] Assignee: Torrax Systems, Inc., North Tonawanda, N.Y.

[22] Filed: Aug. 31, 1970

[21] Appl. No.: 68,085

[52] U.S. Cl. .......................... 48/111, 48/76, 48/203, 48/209, 201/25, 202/121
[51] Int. Cl. ................................................ C10j 3/00
[58] Field of Search ...... 48/111, 209, 76, 203, 197 A; 23/262; 208/370

[56] References Cited

UNITED STATES PATENTS

| | | | |
|---|---|---|---|
| 1,374,887 | 4/1921 | Sawtelle | 48/209 UX |
| 1,571,877 | 2/1926 | McElroy | 48/203 |
| 2,126,150 | 8/1938 | Stryker | 48/209 UX |
| 3,387,836 | 6/1968 | Stookey | 263/20 |
| 3,511,194 | 5/1970 | Stookey | 110/8 |

*Primary Examiner*—Joseph Scovronek
*Attorney*—K. W. Brownell

[57] ABSTRACT

In an apparatus and method of treating waste materials for recovering valuable materials including a fuel gas and liquid hydrocarbons, the waste materials are charged to the upper end of a vertical gasification chamber and preheated air blast is introduced into the hearth thereof. A producer gas is generated within the gasifier at such a temperature that metal, glass and other noncombustibles are reduced to a molten condition. As waste materials move downwardly under gravity, the hot producer gas moves upwardly pyrolyzing an organic portion of the waste materials. The gases evolved in the gasifier are passed from the upper end thereof and contacted with a cooling liquor comprising water. Thus, entrained particulate and a condensable portion including liquid hydrocarbons are separated from the evolved gases into a liquid phase whereby a fuel gas is produced.

14 Claims, 5 Drawing Figures

INVENTORS
KENNETH W. STOOKEY
ANIL K. CHATTERJEE
BY
K.W. Brunell

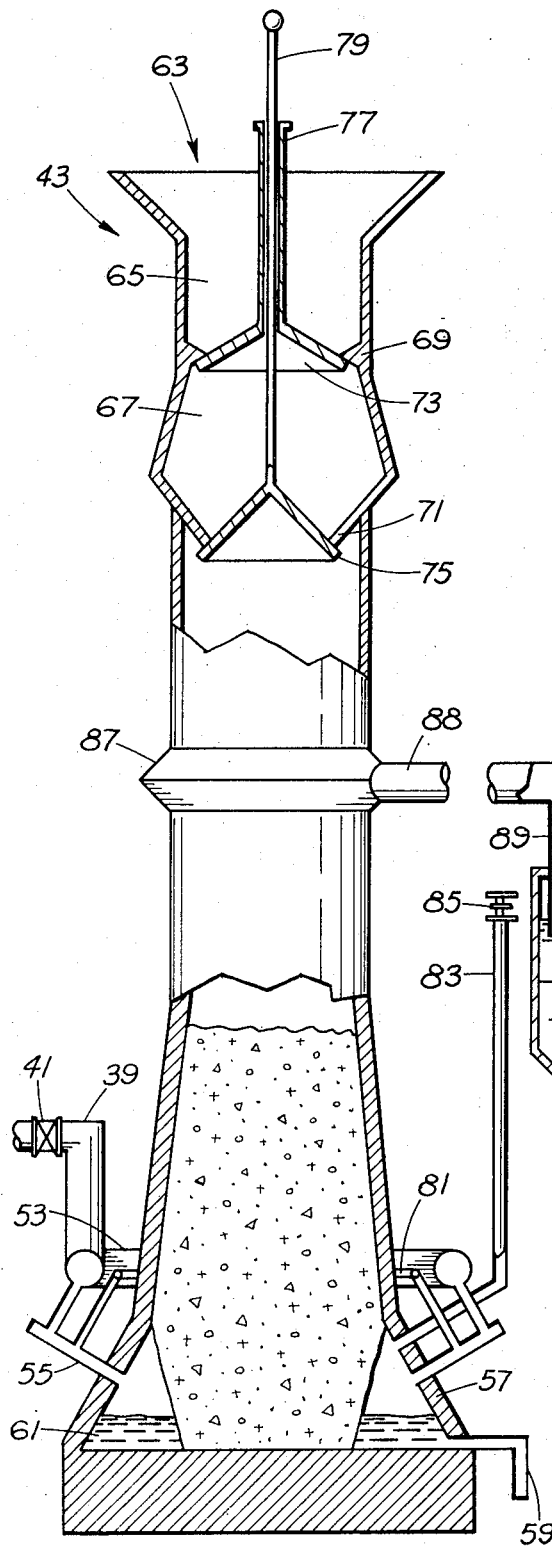

INVENTORS
KENNETH W. STOOKEY
ANIL K. CHATTERJEE
BY
K.W. Brownell

PRODUCTION OF USABLE PRODUCTS FROM WASTE MATERIAL

BACKGROUND OF THE INVENTION

Incineration as a method of disposal of refuse has been found highly desirable as opposed to landfills which contaminate the land and water and open burning which pollutes the air. High temperature incineration immediately disposes of refuse which might provide a breeding ground for rodents and insects, produces a residue which is inert and readily acceptable as landfill, and discharges nonpollutant gaseous products to the atmosphere.

In U.S. Pat. No. 3,511,194 entitled "Method and Apparatus for High Temperature Waste Disposal" by inventor K. W. Stookey, a method and apparatus are disclosed wherein there is complete conversion of variable mixture of organic and inorganic city type waste product to a fully oxidized condition of the combustibles and a melting and fusion of the inorganic fraction. The initial reaction occurs at sufficiently high temperature so that the inorganic content of the charged materials is converted to an inert, molten mass, which is easily disposed of after it has been tapped from the vessel and attained ambient temperature.

Thus, there is the complete conversion of waste material to clean, inert gases as a by-product of the combustible and organic portion of the charge, with the inorganic portion being concentrated as a granulated slag and roughly spherical metallic pellets which are easily disposed of. This result is achieved by the use of high temperatures in such a manner that refuse is completely combusted and reduced. Thus, undesirable by-products of combustion such as noxious odors, smoke, fly ash and the like are eliminated from the final effluents discharged.

The present invention has numerous advantages in addition to completely disposing of the endless variety of waste materials which are received from municipalities, industries and the like without pollution, for usable products which are recovered from refuse can be sold. The present invention is so attractive that it competes with the most economical methods of waste disposal such as landfill, open dumping, and open burning. Fuel gas produced from refuse can be piped directly to a consumer or stored for subsequent use. A portion of the fuel gas may be used to meet the fuel requirements of the present invention. The molten slag produced serves as a useful inert fill and source for valuable minerals after being withdrawn from the gasifier and cooled. Condensed tars containing particulate are ideally suited for road paving. Oils are useful as lubricants. Other chemicals produced are useful in the preparation of pharmaceutical products, tanning preparations, insecticide bases and other valuable products.

It is known that refuse containing a variety of materials such as cardboard, newspaper, garbage, leaves, grass, plastics, textiles, and wood carbonized by destructive distillation can produce a gas suitable for combustion, liquid tars and oils which carry many valuable chemicals, a solid residue of char, and frequently inert materials. Various attempts to decrease the cost of operating an incinerator by recovering usable products have largely been unsuccessful.

Prior art methods utilize conveyors, screws, gratings, elevators and mechanical parts in proximity to burning rubbish, which become clogged and gummed with tars causing a decrease in efficiency and maintenance shutdowns. Other methods employ low temperatures causing accumulation of undesirable components. Heretofore, neither a method nor apparatus has been devised for efficiently obtaining usable products from a large quantity and variety of refuse.

SUMMARY OF THE INVENTION

It is an object of the present invention to provide an economically attractive method and apparatus for disposing of waste material by pyrolysis so as to obtain useful products therefrom.

Other and further objects of the present invention will become apparent from the following description.

In accordance with the present invention there is provided an apparatus for making usable products, including a fuel gas and liquid hydrocarbons, from waste material comprising a substantially vertical chamber having means for charging said waste material into the upper portion for movement downwardly through said vertical chamber, means for supplying a hot air blast to a lower portion of said chamber to generate a producer gas at such temperature so as to convert inorganic materials to a molten condition at the bottom of said chamber, means for passing gases evolved in said vertical chamber from the upper portion thereof, said evolved gases including a portion pyrolyzed from an organic portion of the waste material by the upwardly moving hot producer gas, and means for condensing the evolved gases to form a condensate comprising liquid hydrocarbons whereby a fuel gas is produced.

BRIEF DESCRIPTION OF THE DRAWINGS

FIG. 2 is a side elevational view of the gasifier with portions shown in section;

FIG. 3 is a vertical cross sectional view of the seal separator;

DETAILED DESCRIPTION OF THE PREFERRED EMBODIMENT

Figure 1:
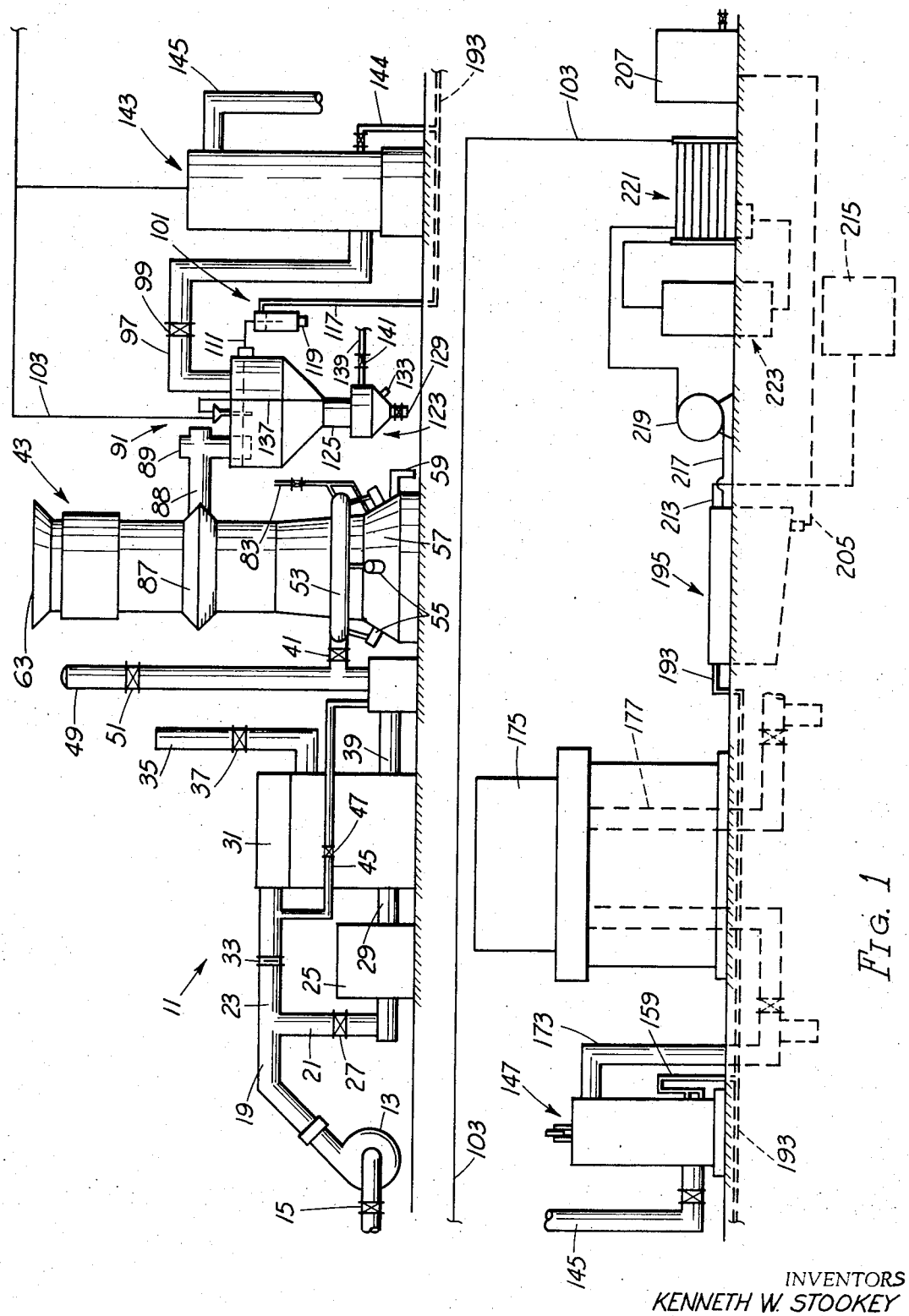
FIG. 1 is a schematic drawing of the apparatus of the present invention for the production of usable products from waste material.

Referring to the drawings in more detail, the portion of the system illustrated in FIG. 1 and indicated at 11 is a hot air blast system. It includes a forced draft blower 13 including motor (not shown) which supplies the pressure needs for the entire system. A valve 15 located in the blower inlet controls the pressure delivered. The blower outlet is connected to conduit 19 which branches into conduit 21 and conduit 23. Conduit 21 provides air to the combustion chamber 25 and has a control means 27 including a valve associated therewith for regulating the air supply to the combustion chamber 25 to maintain proper burning therein. Conduit 29 connects the combustion chamber 25 to the heat exchanger 31 for the passage of hot exhaust gases. Conduit 23 which provides process air has associated therewith a control 33 of the aforementioned type 27 for regulating the process air supplied to heat exchanger 31.

The heat exchanger 31 is the type composed substantially of refractory components wherein the hot gaseous exhaust from the combustion chamber 25 indirectly heats the process air. The heat exchangers described in U.S. Pat. Nos. 3,129,931; 3,220,711; and 3,387,836 to Kenneth W. Stookey which employ thin walled tubes and a plurality of head blocks are of the type preferably used in the present invention.

Exhaust pipe 35 leading from the heat exchanger vents the combustion products to the atmosphere after passing through throttling valve 37 which creates sufficient back pressure to retard leakage within he heat exchanger 31. Conduit 39 which has valve 41 supplies hot process air to the gasifier 43 from the heat exchanger 31. The temperature of the process air is controlled by air bypass line 45 having a valve 47. Vent pipe 49 connecting conduit 39 includes valve 51 normally closed but which can be opened to relieve a pressure buildup in the hot air blast system.

To maintain a suitable head of pressure the hot blast system is preferably provided with controls whereby the entire heat exchange system is operable at high pressures without detrimental effects. This control system which is disclosed in copending U.S. Pat. application No. 34,960, filed May 6, 1970, now U.S. Pat. No. 3,606,282 entitled "High Temperature Heat Exchanger and Method of Operating" by Kenneth W. Stookey, regulates the flow and pressure of the hot blast.

Conduit 39 connects to bustle pipe 53 which is around the lower portion of the vertical shaft gasifier 43. The bustle pipe 53 includes a number of penstocks each having tuyeres 55 which are circumferentially spaced around the base of the vertical shaft gasifier 43. At the base of the vertical shaft gasifier 43 is a hearth 57 or well which has one or more sealed tap holes 59. The tap holes 59 serve as an outlet for the fluid inorganic waste product 61 which is drained from the gasifier 43 and thereby separated from the organic waste product.

The waste material is initially charged to the gasifier at the upper end through access opening 63. The waste product can be continuously or semi-continuously charged by conveyor or batch charged by a loading bucket. A supply chamber 65 is disposed above feed chamber 67. Each chamber is provided with interior vanes or walls 69 and 71 which slope downwardly and inwardly. Bell valves 73 and 75 are carried by sleeve 77 and rod 79 respectively and are seated against walls 69 and 71 to close the chambers. In operation supply chamber 65 is charged with refuse with bell 73 closed. Bell 73 then opens depositing refuse in chamber 67 while bell 75 is closed. Bell 73 then closes and bell 75 opens depositing refuse in the vertical shaft gasifier 43. The sequential use of the described double bell charging system prevents leakage of gases from the system during charging since the gasifier operates under pressure.

The temperature of the hot air blast supplied through tuyeres 55 is preferably less than about 1,900° F. It is regulated so that substantially all the inorganic waste material is melted out of the waste material. The hot blast temperature can vary and should be reduced for low orders of inorganic content and correspondingly increased for higher orders of inorganic content in the waste materials.

The temperature within the gasifier 43 can be additionally regulated by controlling the amount of auxiliary fuel provided to tuyeres 55 through fuel line 81. The extra burning provided by increasing the fuel supply sustains proper combustion when there is insufficient organic material in the refuse and prevents plugging or clogging of the gasifier. Accompanying an increase in burning in the hearth is an increase in the amount of completely combusted gases present in the gasifier 43. These combusted gases can be vented from the hearth 57 through line 83 by opening valve 85 so that they do not contaminate the fuel gas.

A producer gas comprising a major portion of carbon monoxide is generated in the hearth zone 57. It is believed that carbon in the descending ignited waste material reacts with oxygen in the hot blast to initially form carbon dioxide so as to generate an adiabatic flame temperature on the order of 4,000° F or more. The carbon dioxide in turn reacts with incandescent carbon immediately to form the carbon monoxide of the producer gas. Moisture present in the refuse reacts with hot carbon according to the water gas reaction to form hydrogen, carbon monoxide, carbon dioxide and methane. As the producer gas generated in the hearth 57 moves upwardly, it releases its sensible heat so as to pyrolyze and distill the refuse descending in the gasifier to a highly volatile portion suitable for use as a fuel gas and a condensable portion of high boiling organic materials.

The gases evolved in the gasifier flow under pressure through a gas collection ring 87 surrounding an upper portion of the gasifier 43. The gases are withdrawn at a temperature of about 400° F to about 600° F. conduit 88 connects gas collection ring 87 to gas off-take tube 89.

Gas off-take tube 89 is a vertically aligned steel pipe fitted with water sprays (not shown) to wash tar from its walls and to cool the evolved gases. It is immersed to suitable depth in seal separator 91 so that the gases are caused to bubble violently through the liquor therein. Preferably the depth of immersion is about 2 to about 4 inches.

The seal separator 91 is a cylindrical tank having a top closed to the atmosphere and a conical bottom 95. It contains a liquor or liquid comprising water, soluble chemicals and miscible liquids which remain therein after a recycle process hereinafter described.

Contacting or quenching the gases evolved from the gasifier with the liquor cools the gases thereby condensing a large portion of the high boiling fraction pyrolyzed and distilled from the waste materials. The high boiling fraction includes substances which become liquid at ordinary temperatures such as xylene, toluene, aniline, nitrobenzene, tars and oils and substances which become solids at ordinary temperatures such as anthracene. Particulates such as carbon particles, metal oxides and ash in the form of dust, which are entrained in the evolved gases, serve as nuclei upon which the vapors condense. The particulate and condensables coalesce into a liquid phase fraction at the bottom of the tank 91 which captures the particulate.

The fuel gas which emanates from the surface of the liquor in tank 91 is a mixture of fixed gases or gases which remain at ordinary temperatures such as hydrogen, methane, ethylene, acetylene, carbon dioxide, carbon monoxide, hydrogen sulfide, nitrogen and ammonia. It is saturated with water and at a temperature of about 200° F. The fuel gas exits the seal separator 91 via conduit 97 which has a valve 99 for shut off. Due to the sensible heat of the fuel gas there still remains low boiling vapors and tar mist in suspension so that the fuel gas is further cooled and cleaned.

The seal separator 91 creates a liquor seal between the evolved gases flowing throughout off-take tube 89 and the fuel gases above the liquor level within the seal separator 91. The flow of evolved gases occurs only when a positive pressure gradient exists between former and latter locations. As gas flows through tube 89, the level of liquor therein is depressed and the evolved gases bubble through the liquor to obtain a first stage cooling and scrubbing. The pressure drop of the gas flow through the separator is equal to the sealing depth of liquor in tube 89. If the blower is shut down or the top of the gasifier is opened to the atmosphere, the pressure of the evolved gases can become less than the pressure of the fuel gases. In this case, the level of liquor in the off-take tube 89 rises to compensate for the pressure differential. Due to the much greater surface area of liquor in the seal separator 91 than in the off-take tube 89, a small decrease in depth in the seal-separator 91 due to increased pressure causes a proportionally large rise of liquor in the off-take tube 89. Thus, the liquor seal is effectively maintained.

A seal pot 101 is utilized to maintain pressure and desired liquor level within the seal separator 91 while permitting a continuous circulation of liquor through the seal separator 91 to flush tars and oils from the seal pot 101. Make up liquor is continuously supplied to seal separator 91 through line 103 having valve 105. Line 103 pours into funnel 107 located above the seal separator 91 and connected to line 109 which is immersed in the seal liquor. The overflow seal liquor flows through line 111 which has a submerged inlet connecting seal separator 91. An elbow in line 111 extends upwardly to the overflow level. The other end of line 111 is immersed in seal pot 101 to a suitable depth. Line 115 which includes valve 113 connects the seal separator 91 above the liquor level with line 111 to equalize the pressure between those locations to prevent siphoning. Valve 113 is open during operation but can be closed for cleaning the seal pot 101. The seal pot 101 includes overflow line 117 and clean out or discharge line 119 which has valve 121 and which can be connected to overflow line 117.

Tar displacement tank 123 is connected to the bottom of seal separator 91 through conduit 125 having submerged valve 127. Drainage outlet 129 including valve 131 connects to the conical bottom of tank 123 for the drainage of a bottom layer of a concentrated mixture of heavy tars and carbonaceous solids. Drainage valve 133 having valve 135 is located intermediate outlet 129 and the top of the tank 123 for draining a lighter top liquid layer. Tank 123 is vented to the atmosphere through lines 137 which is connected to the top of tank 123 at one end. The other empties into funnel 107. Liquor fill line 139 connects to a top portion of tank 123. Valve 141 regulates the flow of make up liquor. The neck of line 137 which extends above the liquor level in the seal separator 91 passes an overflow of excess make up liquor to tank 123.

With tank 123 filled with liquor, valve 127 open, and valves 131, 135 and 141 closed, as shown in FIG. 3, the tars and solids settle into tank 123. As the tars settle into tank 123 the liquor displaced thereby flows through line 111. When it is necessary to drain the tar accumulation from tank 123, valve 127 is closed and valves 135 and 131 are opened, in that sequence. The tar and liquor mixture can be extracted into a portable vessel for disposal without interrupting the operation of the seal separator 91. Once tank 123 is satisfactorily cleaned, valves 131 and 135 are closed. Valve 139 is opened until liquor flows from overflow or vent line 137 to indicate that tank 123 is filled and ready for operation. Valve 127 is then opened to resume the settling operation. Thus, the seal is maintained in the seal separator 91.

The fuel gas flows through conduit 97 which is connected to an inlet in the bottom of gas scrubber 143. After passing through seal separator 91 the fuel gas is at a reduced temperature. With a substantial portion of the high boiling condensable materials having been removed, it comprises organic materials having low boiling points and a highly volatile portion comprising fixed gases at normal temperatures suitable as a commercial fuel. The gas scrubber 143 is of a conventional type wherein the gases to be cleaned and cooled flow upwardly and are directly contacted with water or liquor sprayed from a plurality of nozzles or jets. The fuel gas passing through fine spray droplets encounters little pressure drop. The fuel gas is cooled to a temperature of about 80° F to about 90° F. This cooling and contacting with liquor effects the condensation of organic vapors such as aqueous vapors, benzene, hexane, light oils and tars having boiling points above this range. Entrained liquids and solids are also scrubbed from the fuel gas and exit the scrubber via line 144. The fuel gas which exits the scrubber 143 via conduit 145 comprises essentially cleaned fixed gases.

Figure 4:
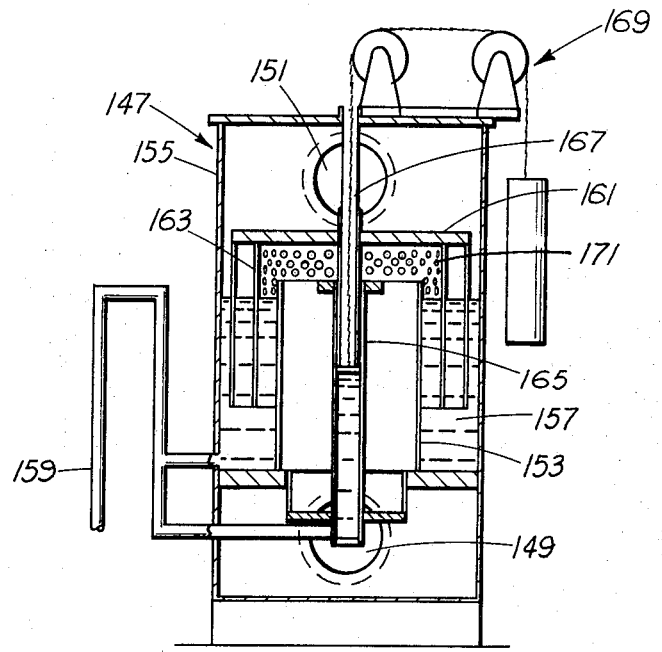
FIG. 4 is a vertical cross sectional view of the tar mist eliminator.
Figure 5:
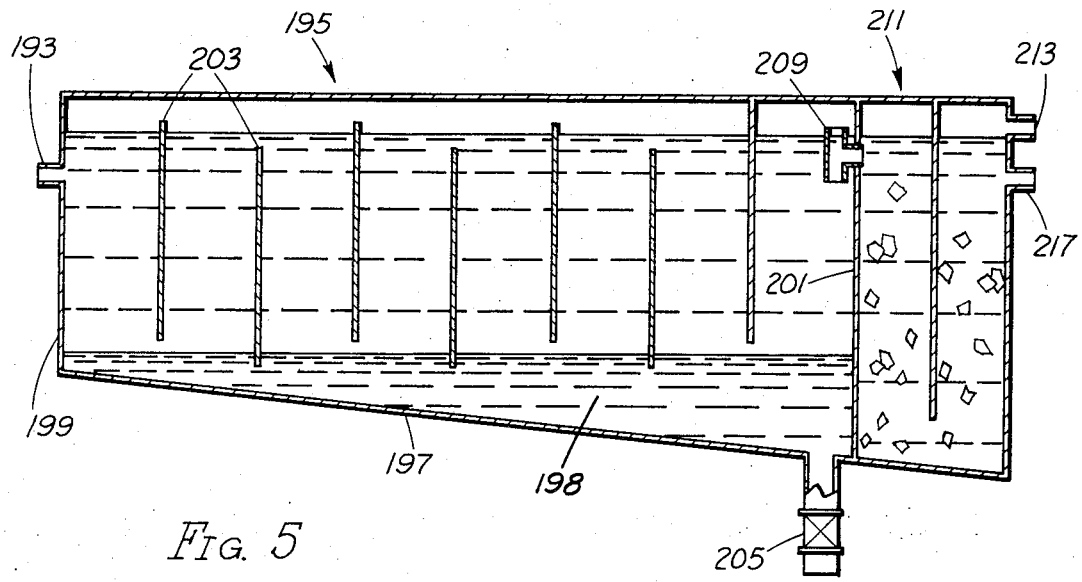
FIG. 5 is a vertical cross sectional view of the tar and liquor separator.

The relatively clean fuel gas from the scrubber 143 flows through conduit 145 to a tar mist eliminator 147 wherein microsized particles which are carried in the gas stream are removed. The tar mist eliminator as illustrated in FIG. 4 is a cylindrical tower having a gas inlet 149 in the lower portion and an outlet 151 in the upper portion. A spaced inner wall 153 between the inlet 149 and outlet 151 is concentric with the tower wall 155 and connected thereto at the bottom portion to form an annular chamber 157. The annular chamber 157 is filled with water or liquor which is maintained at a proper level by overflow pipe 159. An inverted drum is formed by a top plate 161 above the liquor level and a plurality of cylindrically spaced vertical walls 163 which are suspended in the liquor. A guide tube 165 is rigidly mounted in the center of the annular chamber 157 and vertically aligned. A slidable tube 167 connected to the top plate 161 is inserted into the guide tube 165 so that the drum may move up and down along its center axis. The drum arrangement is vertically supported by an overhead counterweight mechanism 169. This includes a chain which passes over a pulley arrangement and is connected at one end to a counterweight. The walls 163 each have a plurality of apertures or orifices positioned so that gases flowing through an aperture impinge against an adjacent wall depositing entrained fluids and solids thereon. The gases escape through neighboring pores or apertures.

In operation, the fuel gas flows through inlet 149 and through the center opening of annular chamber 157. By the wire draw and impingement principle the mixture is drawn together and flows through the many small orifices at high velocity. The streams impinge upon a succeeding wall causing the mist to coalesce on the wall and drain down into the reservoir at the bottom. The excess accumulation is drained through line 159. The clean gases exit through gas outlet 151. The balanced drum responds to changes in flow within the tar demister 147 by rising or falling into or out of the liquor and thus exposing a greater or lesser number of apertures 171. In this manner, the pressure drop across the walls 163 and the impingement velocity of the gases is maintained relatively constant and at an effective removed level in spite of a variable flow of gases.

Outlet 151 is connected to conduit 173 for the passage of fuel gas to a gas storage holder 175 for subsequent distribution through conduit 177. The fuel gas which comprises methane and water gas is clean so that it can be sent into a gas distribution system without further precipitation of deposits. A further temperature drop will condense some water vapor which is conventionally collected in drip tanks and pumped periodically to preclude gas line restrictions in low spots.

The liquor including condensed liquids, particulate and other residues from the seal separator 91, the gas scrubber 143 and tar mist eliminator 147 are respectively drained through the lines 117, line 144 and 159 into line 193. This latter line 193 empties the liquor into separator 195. Separator 195 is a rectangular tank having a bottom 197 sloping downwardly from the inlet end 199 to the outlet end 201. A plurality of baffles 203 are vertically aligned, longitudinally spaced, and extend transverse to the fluid flow. The baffles 203 direct the liquor upwardly and downwardly so as to pass the liquor over and then under a baffle. The slope of the floor or bottom 197 together with slow movement of the liquor through the baffled tank causes a gravity separation. The heavy condensed liquids and solids 198 are concentrated on the bottom where they seal alternate baffles. An accumulation is withdrawn through line 205. The lighter organic fluids which can be skimmed from the surface together with the heavier tars are stored in tar storage tank 207 for subsequent use.

Overflow line 209 from the separator 195 empties lighter liquor into a well 211 which is filled with limestone or coke which acts as a filter to trap any fine globules in suspension that might have escaped separation. An overflow line 213 from the well 211 relieves the waste disposal system of the present invention of surplus water which can be created by the charging of moisture laden refuse and the burning thereof. The overflow liquor is treated in water treatment plant 215 prior to distribution to a sewer system.

Clean liquor is withdrawn from well 211 through line 217. Pump 219 transports the liquor to heat exchanger 221 wherein the liquor is cooled prior to its being recirculated to the seal separator 91 and the gas scrubber 143. The liquor passes through the tube side of heat exchanger 147 with the shell side being cooled by clean water passing over the tubes. The water used to cool the liquor is pumped from the cooling coil chamber through an evaporative cooler 223 to dissipate its absorbed heat and recycled with make up water being added. Under a pressure head supplied by pump 219, the liquor exits the tube side of the heat exchanger and flows through line 103. Line 103 supplies recycle make up liquor to the scrubber 143 and seal separator 91.

OPERATION

In operation there is continuously supplied a hot air blast to the hearth 57. The temperature within the hearth can be controlled by regulating the temperature of the hot air blast, the quantity of air and gaseous fuel supplied thereto and the regulation of vent line 83. Assuming that there is a high noncombustible content in the waste material, the temperature of the hot air blast is kept high while the quantity of air is reduced; and conversely, where there is a high combustible content of waste, the temperature of the hot air blast can be correspondingly lowered while increasing the quantity supplied to the hearth 57 to provide an oxygen balance necessary for effecting the partial combustion. The temperature may be additionally regulated by the amount of auxiliary fuel provided to tuyeres 55. The temperature is thus maintained so as to effect a complete reduction of all materials within the gasifier to either a molten condition which is the case with glass, metals, etc. or to a gaseous condition which is the case with organic components in the waste material.

As the waste material charged to the gasifier 43 descends, it contacts the ascending highly combusted gases from he hearth zone. Carbon dioxide and water in the ascending gases react with incandescent organic material in the descending waste material to form hydrogen gas and carbon monoxide. The hot gases further distill and pyrolyze the waste material to form gases and volatile organic vapors. The gases evolved are withdrawn from the gasifier 43 and cooled and saturated by directly contacting with water in the seal separator 91 and high boiling organic materials are thus condensed. A resulting fuel gas is highly combustible but is subsequently further cooled and scrubbed prior to use. A lower boiling portion of condensable organic material is removed in the cooling scrubber 143 and the fuel gas is finally cleaned in the tar mist eliminator 147.

In the present invention, the gases and vapors are cooled and condensed immediately upon being vented fro the gasifier. The fixed gases are cleaned of vapors and can be used as fuel within the plant or sold to others. The condensed liquids also have a high fuel value so they can easily be stored in concentrated form for later use at the plant or for sale and use by others. Valuable chemicals may be extracted under certain conditions with the remaining residues able to be used as fuel.

Various conventional methods may be used to clean the fuel gas exiting the seal separator 91. Cyclone scrubbers, sieve trays, plate towers and various packed towers may be employed to scrub the fuel gas. The tar mist eliminator may be an electrostatic precipitator instead of the impingement type. Preferably cleaning apparatus requiring only small pressure drops are employed.

While preferred embodiments of this invention have been described and illustrated, it is to be recognized that modifications, variations thereof may be made without departing from the spirit and scope of this invention as described in the appended claims.

What is claimed is:

1. An apparatus for making useful products, including a fuel gas and liquid hydrocarbons, from waste material comprising: a substantially vertical chamber having means for charging waste material into the upper portion of said chamber for movement downwardly through said chamber; means for supplying a hot air blast under pressure to a lower portion of said chamber to generate a producer gas at such a temperature as to convert inorganic materials to a molten condition at the bottom of said chamber; means for passing gases evolved in said chamber from the upper portion thereof; said evolved gases including a portion pyrolyzed from an organic portion of the waste material by the upwardly moving producer gas; a separating tank holding a liquor comprising water; means for maintaining the liquor within said tank at a relatively constant level; a vertically aligned tube communicating with said means for passing evolved gases and having a discharge opening below the surface of the liquor, said tank having an outlet opening for the passage of fuel gas above the level of the liquor; a displacement tank positioned below said separating tank; a passage having a submerged valve, said passage communicating between the bottom portion of said separating tank and the upper portion of said displacement tank for the passage of settled material.

2. An apparatus according to claim 1 wherein said means for supplying a hot air blast includes a refractory heat exchanger for heating the air with hot gases of combustion to produce the hot air blast.

3. An apparatus according to claim 1 wherein said chamber is provided with an annular hearth at the lower portion thereof and a tap for removing molten materials from said hearth.

4. An apparatus according to claim 3 including a plurality of circumferentially spaced penstocks having tuyeres attached thereto that project into said hearth to provide an inblow of hot blast.

5. An apparatus according to claim 1 wherein said charging mans includes a pair of charging valves, one positioned above the other for sequential operation so as to maintain pressure within said vertical chamber during charging of waste material.

6. An apparatus according to claim 1 wherein said means for passing evolved gases comprises a gas collection ring.

7. An apparatus according to claim 1 further comprising a scrubber for cooling and cleaning the fuel gas from said separating tank.

8. An apparatus according to claim 7 further comprising a means for removing entrained material, from the fuel gas.

9. An apparatus according to claim 8 wherein said removing means includes a plurality of spaced walls disposed in the path of the fuel gas, each wall having a plurality of apertures therein positioned so fuel gas passing through the apertures of one wall impinges against an adjacent wall depositing entrained materials thereon.

10. An apparatus according to claim 1 comprising means for continuously supplying a liquor comprising water to said condensing means, said condensing means directly contacting evolved gases with the liquor to form a liquid phase comprising condensable materials; means for separating a liquor comprising water from the liquid phase; and recycling the liquor to said condensing means.

11. An apparatus according to claim 7 comprising means for continuously supplying a liquor comprising water to said scrubber, said scrubber directly contacting fuel gas with the liquor to form a liquid phase comprising condensable materials; means for separating a liquor comprising water from the liquid phase; and recycling the liquor to said scrubber.

12. A method for making usable products, including a fuel gas and liquid hydrocarbons, from waste material comprising: passing the waste materials downwardly within a substantially vertical combustion chamber, directing a hot air blast into the lower portion of said vertical chamber to generate a producer gas at such a temperature as to convert inorganic materials to a molten condition at the bottom of said chamber; passing gases evolved in said chamber from the he upper portion thereof, said evolved gases including particulate and a high boiling fraction and a low boiling fraction of gases pyrolyzed and distilled from an organic portion of the waste material by the upwardly moving producer gas; and bubbling said evolved gases through a separating tank holding a liquor comprising water to form a fuel gas from the low boiling fraction and to coalesce the particulate and high boiling fraction into a liquid phase fraction at the bottom of the tank.

13. A method according to claim 12 comprising scrubbing the fuel gas.

14. A method according to claim 13 comprising removing entrained materials from said fuel gas after scrubbing.

* * * * *